US007197090B1

(12) United States Patent
Berger et al.

(10) Patent No.: US 7,197,090 B1
(45) Date of Patent: Mar. 27, 2007

(54) ADAPTIVE DECISION REGIONS AND METRICS

(75) Inventors: Harvey L. Berger, Redondo Beach, CA (US); Samuel J. Friedberg, Torrance, CA (US); James C. Becker, Torrance, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/240,275

(22) Filed: Jan. 29, 1999

(51) Int. Cl.
*H04L 25/06* (2006.01)

(52) U.S. Cl. .................. 375/317; 375/322; 375/287
(58) Field of Classification Search ............. 375/278, 375/324, 341, 340, 232; 329/304; 714/709
See application file for complete search history.

(56) References Cited

U.S. PATENT DOCUMENTS

| | | | | |
|---|---|---|---|---|
| 4,099,121 | A | * | 7/1978 | Fang ........................ 375/267 |
| 4,873,701 | A | | 10/1989 | Tretter |
| 5,307,377 | A | | 4/1994 | Chouly et al. |
| 5,343,499 | A | | 8/1994 | Jasper et al. |
| 5,363,408 | A | | 11/1994 | Paik et al. |
| 5,384,810 | A | * | 1/1995 | Amrany ..................... 375/340 |
| 5,440,259 | A | | 8/1995 | Yokomura |
| 5,440,268 | A | | 8/1995 | Taga et al. |
| 5,442,655 | A | | 8/1995 | Dedic |
| 5,485,489 | A | | 1/1996 | Chiba |
| 5,491,698 | A | * | 2/1996 | Patel et al. .................. 341/59 |
| 5,500,876 | A | | 3/1996 | Nagata |
| 5,519,356 | A | * | 5/1996 | Greenberg ................. 329/304 |
| 5,537,439 | A | * | 7/1996 | Choi ........................ 375/229 |
| 5,550,868 | A | | 8/1996 | Boccuzzi |
| 5,598,441 | A | | 1/1997 | Kroeger et al. |
| 5,604,768 | A | * | 2/1997 | Fulton ....................... 370/350 |

(Continued)

FOREIGN PATENT DOCUMENTS

JP   3239043   10/1991

(Continued)

OTHER PUBLICATIONS

"Error Bounds for Convolutional Codes and Asymptotically Optimum Decoding Algorithm" by A.J. Viterbi, *IEEE Trans. Inf. Theory*, IT-13 pp. 260-269, Apr. 1967.

(Continued)

*Primary Examiner*—Kevin Kim
(74) *Attorney, Agent, or Firm*—Katten Muchin Rosenman LLP; John S. Paniaguas

(57) ABSTRACT

An improved decoding technique useful for hard decision decoding, such as quadrature phase shift keying (PSK) and quadrature amplitude modulation (QAM), as well as soft-decision techniques, such as Viterbi decoding and trellis decoding. The system in accordance with the present invention provides adaptive decision regions for hard-decision decoding techniques and adaptive metrics for soft-decision detection techniques in which the decision boundaries and reference constellations, respectively are optimized in order to minimize the bit error rate (BER). In particular, the decision boundaries and metrics are optimized based on the locations of the received constellation points. By adaptively adjusting the decision boundaries and metrics, the BER can be greatly improved with the need for nonlinear predistortion at the transmitter thus reducing the hardware complexity and weight of the transmitter which provides additional benefits in applications, such as satellite communication systems, where the transmitter is located on the satellite.

18 Claims, 8 Drawing Sheets

U.S. PATENT DOCUMENTS

| | | | |
|---|---|---|---|
| 5,612,651 A | | 3/1997 | Chethik |
| 5,615,230 A | | 3/1997 | Günther et al. |
| 5,640,417 A | * | 6/1997 | Barabash et al. .......... 375/222 |
| 5,654,986 A | * | 8/1997 | Lim ........................ 375/341 |
| 5,710,793 A | * | 1/1998 | Greenberg ................ 375/232 |
| 5,761,216 A | * | 6/1998 | Sotome et al. ............. 714/738 |
| 5,832,039 A | * | 11/1998 | Rijns ........................ 375/317 |
| 6,487,261 B2 | * | 11/2002 | Iwamatsu et al. .......... 375/346 |

FOREIGN PATENT DOCUMENTS

| | | |
|---|---|---|
| JP | 5236039 | 9/1993 |
| JP | 7288552 | 10/1995 |

OTHER PUBLICATIONS

"Error Coding Cookbook", by C. Britton Rorabaugh, McCraw Hill copyright 1996, pp. 105-125.

* cited by examiner

US 7,197,090 B1

ADAPTIVE DECISION REGIONS AND METRICS

The U.S. Government has certain rights in this invention pursuant to the clause at FAR 52.227-12.

BACKGROUND OF THE INVENTION

1. Field of the Invention

The present invention relates to a method for demodulating and a demodulator for demodulating various signals by hard-decision techniques, such as phase shift keying (PSK) and quadrature amplitude modulation (QAM); as well as demodulating signals by soft-decision techniques, such as Viterbi decoding and trellis decoding. For hard-decision techniques, the decision regions are optimized at the receiver to reduce the bit error rate (BER); and for soft-decision techniques, the decision metrics are optimized at the receiver to reduce the bit error rate (BER). Optimizing the decision regions and metrics may obviate the need for non-linear predistortion at the transmitter.

2. Description of the Prior Art

Various modulation techniques are known for modulating a carrier signal with various types of information. Due to limited bandwidth allocations, modulation techniques have been developed to increase the amount of information that can be transmitted per frequency. One such technique is known as quadrature phase shift keying (QPSK). Such QPSK modulation techniques are known in the art and described in U.S. Pat. Nos. 5,440,259; 5,615,230; 5,440,268; 5,550,868; 5,598,441; 5,500,876 and 5,485,489, hereby incorporated by reference. In general, in such a modulation technique, the phase of both the real and quadrature components of the carrier are modulated to enable two bits, each having two stages, to be transmitted over a single frequency. As such, at each frequency, the carrier can be modulated into one of four different phase states, known as symbols, which form a constellation as generally shown in FIG. 1. The QPSK modulation technique is thus able to provide twice the information per frequency relative to amplitude and frequency modulation techniques, making it suitable for applications in which bandwidth allocations are relatively limited, for example, in satellite communications systems.

In order to further increase the amount of information transmitted per frequency, other modulation techniques have been developed, such as quadrature amplitude modulation (QAM). Such QAM modulation techniques are relatively well-known in the art. Examples of such QAM modulation techniques are disclosed in U.S. Pat. Nos. 5,612,651; 5,343, 499; 5,363,408; and 5,307,377; hereby incorporated by reference. Such QAM modulation techniques essentially involve amplitude and phase modulation of a QPSK signal to provide constellations of signals of 8, 16, 32 and 64 and more, for example, as illustrated in FIG. 2.

Decoding of PSK and QAM modulated signals is also known in the art. In general, the PSK or QAM signal is received, demodulated, filtered and sampled. The sample is known as the decision variable. For example, the QPSK constellation illustrated in FIG. 1 can be divided into four symmetric decision regions, each representing one quadrant, identified with the reference numerals 20, 21, 22 and 26. Similarly, for an 8PSK constellation as illustrated in FIG. 3, there are 8 decision regions 30, 32, 34, 36, 38, 40, 42 and 44. Each decisions region 30–44 is defined by a rotationally symmetric 45° slice of a pie as shown by the dotted lines in FIG. 3. In order to decode the symbols, the bit or symbol decisions are based upon determining the decision region in which the decision variable is located. This technique is known as hard-decision detection.

Other coding and decoding techniques are known, such as trellis decoding and Viterbi decoding. Trellis coded demodulation is discussed in detail in U.S. Pat. No. 4,873,701, hereby incorporated by reference. Convolutional coding techniques are also known. Such convolutionally coded signals are known to be decoded by a procedure, known as Viterbi decoding. Viterbi decoding is discussed in "Error Bounds for Convolutional Codes and Asymptotically Optimum Decoding Algorithm" by A. J. Viterbi, *IEEE Trans. Inf. Theory*, IT-13 pp. 260–269, April 1967. Convolutional coding/Viterbi decoding techniques are also disclosed in "Error Coding Cookbook", by C. Britton Rorabaugh, McGraw Hill copyright 1996, pp. 105–125, hereby incorporated by reference. Such techniques are known as soft-decision techniques. In such soft-decision techniques, a decision metric is typically computed as the distance between the received decision variable and a reference constellation.

Unfortunately, there are problems associated with the hard-decision techniques as well as the soft-decision techniques which lead to a degradation in the error rate (BER) performance of the system. Such problems are a result of modulator implementation imperfections, channel filtering, amplifier non-linearities and demodulator imperfections. These various problems result in the noise-free decision variables not being at their ideal locations and not equidistant from the nearest decision boundaries. As such, decisions that are made relative to the ideal decision regions are less than ideal leading to an increased BER. In soft-decision decoding techniques, the problems mentioned above result in the noise free constellation not being at an ideal location.

These problems are best understood with reference to FIGS. 4 and 5 which illustrate a binary phase shift keying (BPSK) example. As shown in FIG. 4, the constellation points ±A are equidistant from the zero axis which acts as a decision boundary. The additive white Gaussian noise (AWGN) probability density functions (PDF) are shown for the two constellation points ±A. As shown, the modulator output signals are transmitted with equal probability providing maximum likelihood decision-making which minimizes the BER.

A non-ideal condition is illustrated in FIG. 5. In this FIG. 5, the constellation points +B and −C have uncalibrated biases, for example, due to modem imperfections, amplifier non-linearity and the like. As shown, the constellation points +B and −C are no longer equidistant to the decision boundary. As such, the decision region boundary no longer provides the maximum likelihood of probability and the probability of error is significantly increased thereby increasing the BER. Thus, there is a need for providing an improved decoding technique which optimizes the BER.

SUMMARY OF THE INVENTION

Briefly, the present invention relates to an improved decoding technique useful for hard decision decoding, such as phase shift keying (PSK) and quadrature amplitude modulation (QAM), as well as soft-decision techniques, such as Viterbi decoding and trellis decoding. The system in accordance with the present invention provides adaptive decision regions for hard-decision decoding techniques and adaptive metrics for soft-decision detection techniques in which the decision boundaries and reference constellations, respectively are optimized in order to minimize the bit error rate (BER). In particular, the decision boundaries and metrics are optimized based on the locations of the received constellation points. By adaptively adjusting the decision boundaries and metrics, the BER can be greatly improved without using non-linear predistortion at the transmitter, thus reducing the hardware complexity and weight of the transmitter which provides additional benefits in applications, such as satellite communication systems, where the transmitter is located on the satellite.

DESCRIPTION OF THE DRAWINGS

These and other advantages of the present invention will be readily understood with reference to the following specification and attached drawing wherein.

DETAILED DESCRIPTION

The present invention relates to a demodulator and a method for demodulating which improves the bit error rate (BER) for both hard-decision decoding techniques, such as quadrature phase shift keying (QPSK), 8PSK, 12/4 quadrature amplitude modulation (QAM), 16-QAM and 32-QAM as well as soft-decision decoding techniques, such as Viterbi decoding and trellis decoding. As discussed above, hard-decision detection techniques generally operate by determining the decision region in which the received signal is located. In soft-decision detection techniques, such as Viterbi decoding and trellis decoding, a decision metric which is the distance between the symbol and a reference constellation, is computed. In both hard-decision and soft-decision decoding techniques, various errors can result as a result of modulator imperfections, channel filtering, amplifier non-linearities as well as demodulator imperfections. In order to optimize the bit error rate (BER) for hard-decision decoding techniques, the system in accordance with the present invention provides an adaptive decision region in which the boundaries of the decision region are forced to be equidistant, for example, from the received signals in order to restore the maximum likelihood decision making ability of the demodulator. In soft-decision decoding techniques, such as Viterbi and trellis decoding, the decision metrics are adaptively adjusted to minimize the bit error rate and restore the maximum likelihood decision-making ability of the demodulator.

One benefit of the present invention is that is may obviate the need for non-linear predistortion techniques, known to be used to compensate for constellation bias errors. In such known compensation techniques, additional hardware is required at the transmitter which increases the complexity as well as the weight and power consumption of the transmitter. In various known satellite communication systems, the transmitters are located on the satellite. In such applications, weight as well as space is significantly limited. The present invention solves this problem by eliminating the need for additional hardware on the satellite while providing an improved BER by providing additional adaptive processing at the receiver, normally located on the ground.

Figure 1:
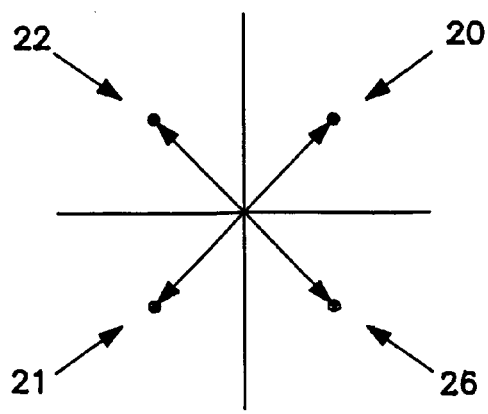
FIG. 1 is a diagram of a QPSK constellation illustrating four symbols and four decision regions.
Figure 2:
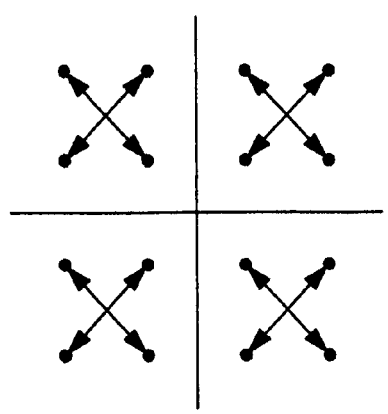
FIG. 2 is a diagram of a 16 QAM constellation.
Figure 3:
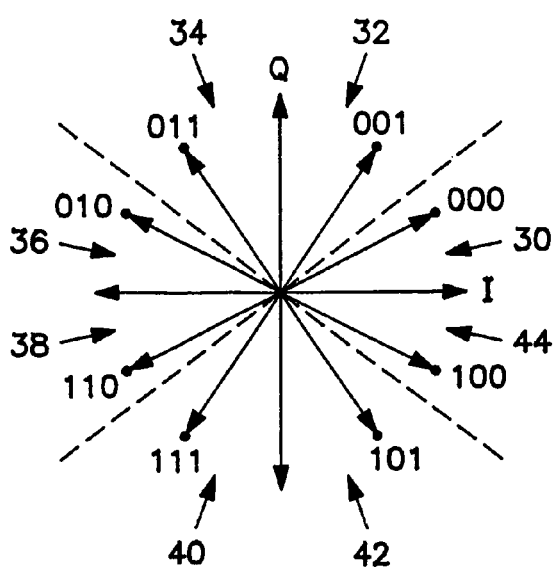
FIG. 3 is a diagram of an 8 QPSK constellation in which the dotted lines represent the boundaries of the decision regions.
Figure 4:
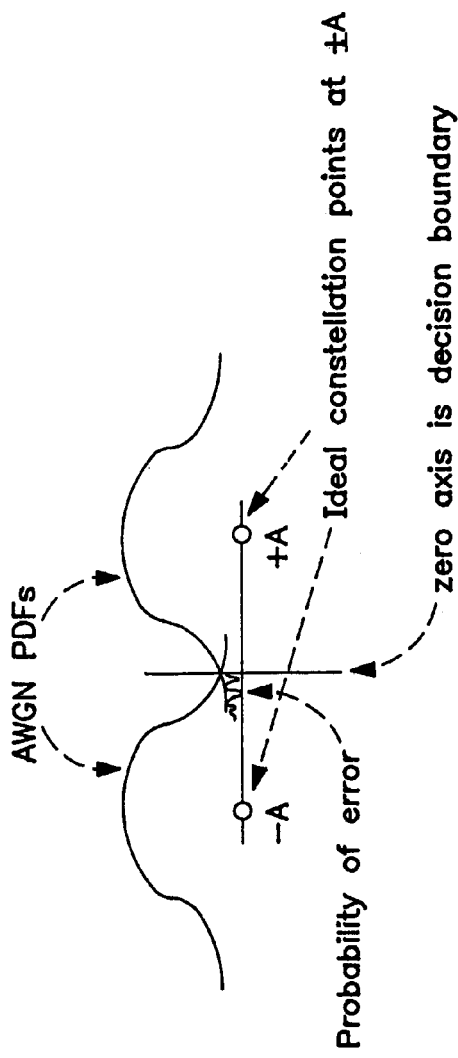
FIG. 4 is a diagram of an ideal binary phase shift keying (BPSK) constellation illustrating the average white Gaussian noise (AWGN) probability distribution functions (PDF).
Figure 5:
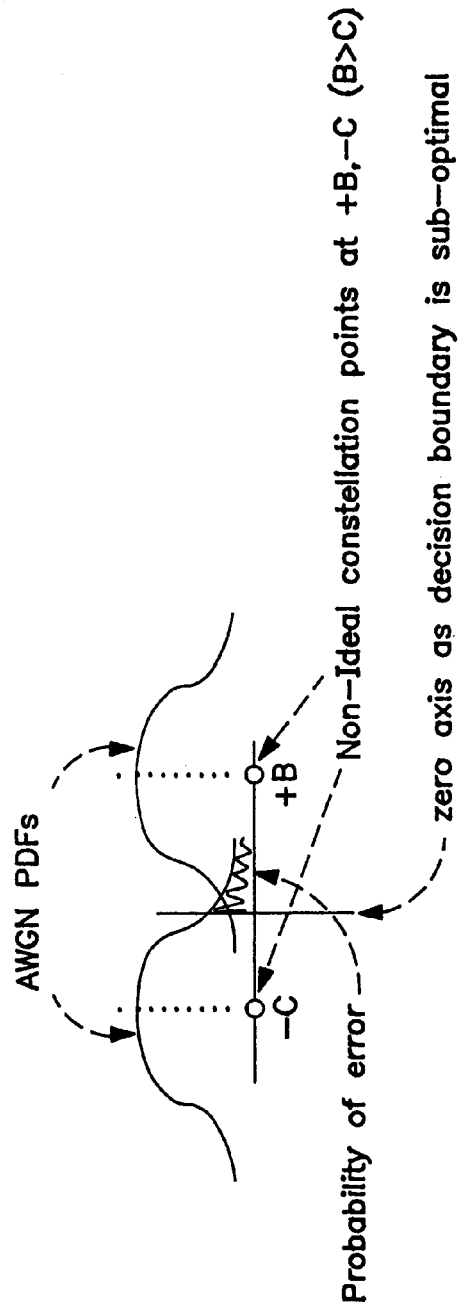
FIG. 5 is similar to FIG. 4 illustrating the constellation points with bias errors.
Figure 6:
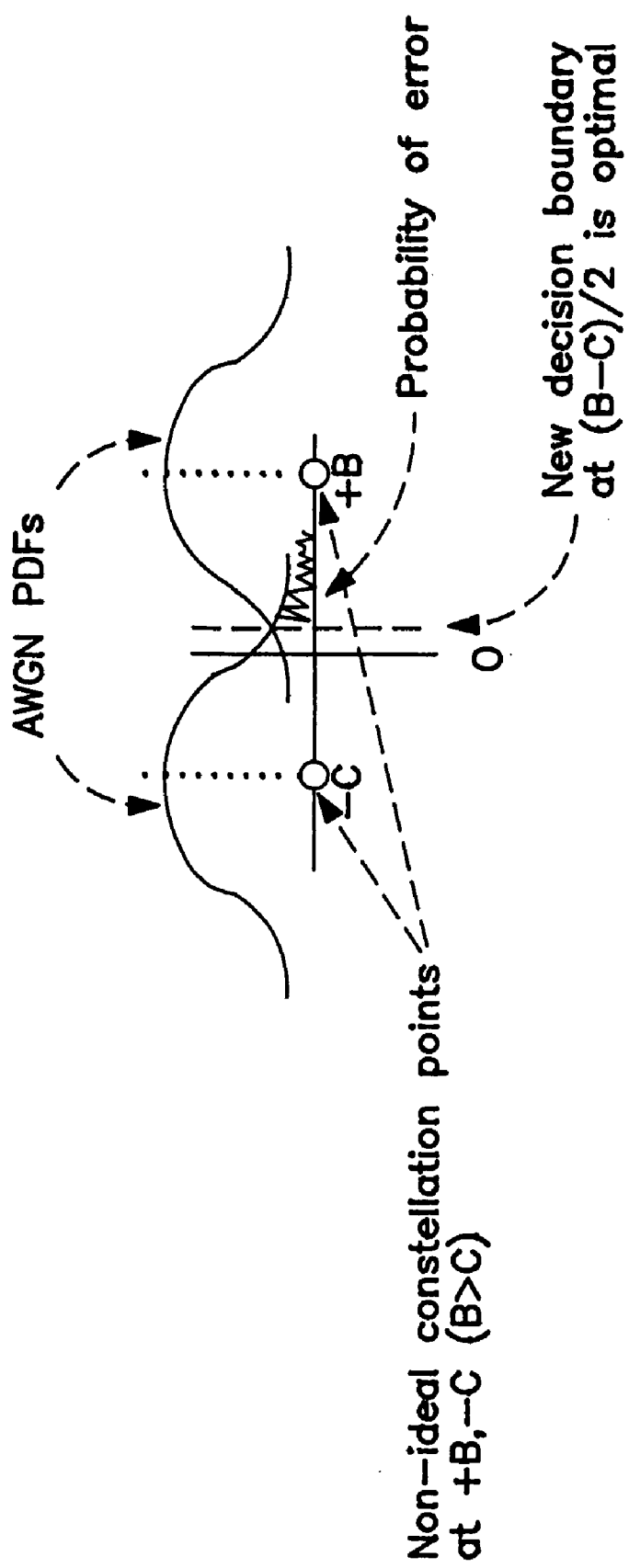
FIG. 6 is similar to FIG. 4 illustrating an adaptive decision boundary based upon the principles of the present invention which has a lower probability of error than the detection system illustrated in FIG. 4.

Examples of the performance of the system is illustrated in FIGS. 4–6. FIG. 4 represents an ideal constellation. For simplicity, a binary phase shift keying (BPSK) example is illustrated. FIG. 5 illustrates two non-ideal constellation points B and C. For purposes of the example, B>C. Also shown are the additive white Gaussian noise (AWGN) probability density functions (PDF) for each of the symbols B and C. Since B>C, the symbols are non-equidistant from the zero axis which forms the right half and left half decision regions for these symbols. As shown in FIG. 5, during such conditions, the probability of error significantly increases relative to the ideal conditions shown in FIG. 4. In accordance with the present invention, the decision boundary, indicated by the dotted line, is adjusted to compensate for the constellation error bias as shown in FIG. 6. For the BPSK example, the decision boundary is adjusted by simply determining the distance between the symbols and dividing it in half ((B-C)/2). As shown, once the decision boundary is adjusted, the probability of error is reduced significantly relatively to FIG. 5 and is potentially adjusted to have the same probability of error as in the ideal condition as illustrated in FIG. 4.

Figure 8:
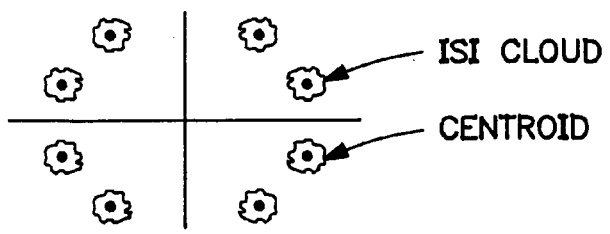
FIG. 8 is a diagram illustrating the optimization of a reference constellation in accordance with the present invention.
Figure 9:
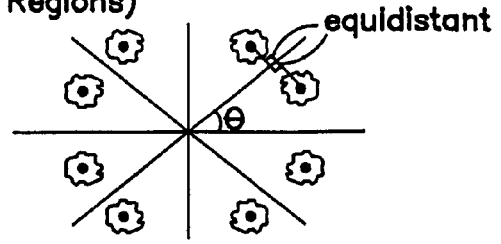
FIG. 9 is a diagram illustrating the optimization of a decision boundary in accordance with the present invention.

Various techniques can be used to optimize decision boundaries or a reference constellation. Examples of these techniques are illustrated in FIGS. 8 and 9. One optimization technique relates to dithering the location of the decision boundary or reference constellation points to minimize the bit error rate (BER) using a minimization method, such as the method of steepest descent. In particular, with reference to FIG. 8, the reference constellation is initialized as the centroid of each cloud. Each point is then dithered both vertically and horizontally while the (BER) is measured. The point is moved to minimize the BER, for example, with an optimization method such as the method of steepest descent. For the example illustrated in FIG. 8, the system sequentially cycles through the points (8 points×2 dimensions).

The decision boundary may be optimized as illustrated in FIG. 9. In particular, the centroid of each cloud is first determined. The decision boundaries are then drawn halfway between the adjacent centroids. An angle Θ, between the decision boundary and the horizontal axis, is dithered while the BER is measured. The angle Θ is adjusted to minimize the bit error rate, for example by the method of steepest descent. Alternatively, each point in the decision space can be initially mapped to the nearest centroid. Then each centroid can be dithered and the decision space remapped to minimize the bit error rate.

Other optimization techniques are also known. The optimization of the decision boundaries or the reference constellation can be performed using any one or combination of techniques. Other optimization techniques include collecting a noiseless or high-SNR constellation in first determining the centroid of each constellation cluster. The optimum decision boundaries are determined by mapping each point in the I/O decision space to the nearest centroid point. Other optimization metrics include mean squared error and accumulated path error, both techniques are relatively well-known in the art.

Various techniques can be used to implement the adaptive decision regions and metrics in accordance with the present invention. These techniques include the techniques mentioned above, in which the centroids and decision boundaries are relocated as well as a technique in which the two dimensional I/Q space at the receiver is conformally remapped to an ideal decision space by way of a programmable lookup table. All such techniques are considered to be within the broad scope of the invention.

Figure 7:
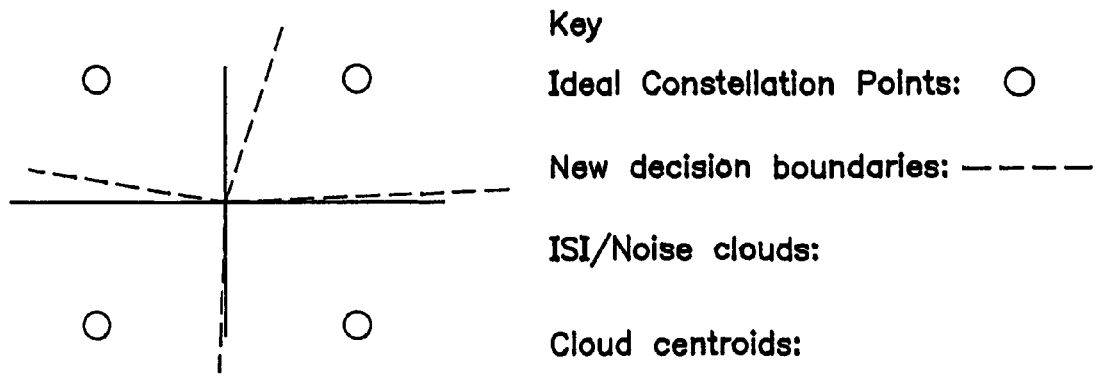
FIG. 7 is a diagram illustrating an adaptive boundary correction technique in accordance with one embodiment of the invention.

As best illustrated in FIG. 7, constellation point biases can be determined after a link is established. Initial calibration can be done using a low data rate or a training sequence.

Figure 10:
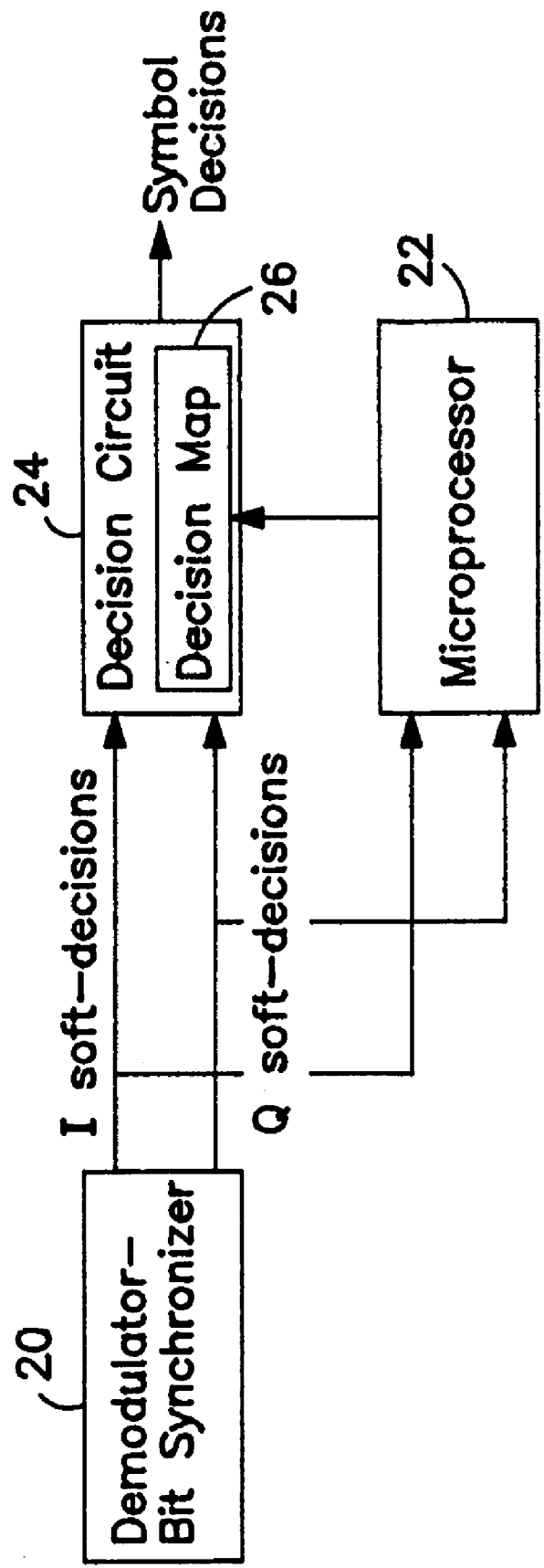
FIG. 10 is an exemplary block diagram of a demodulator in accordance with the present invention which utilizes hard-decision decoding techniques.
Figure 11:
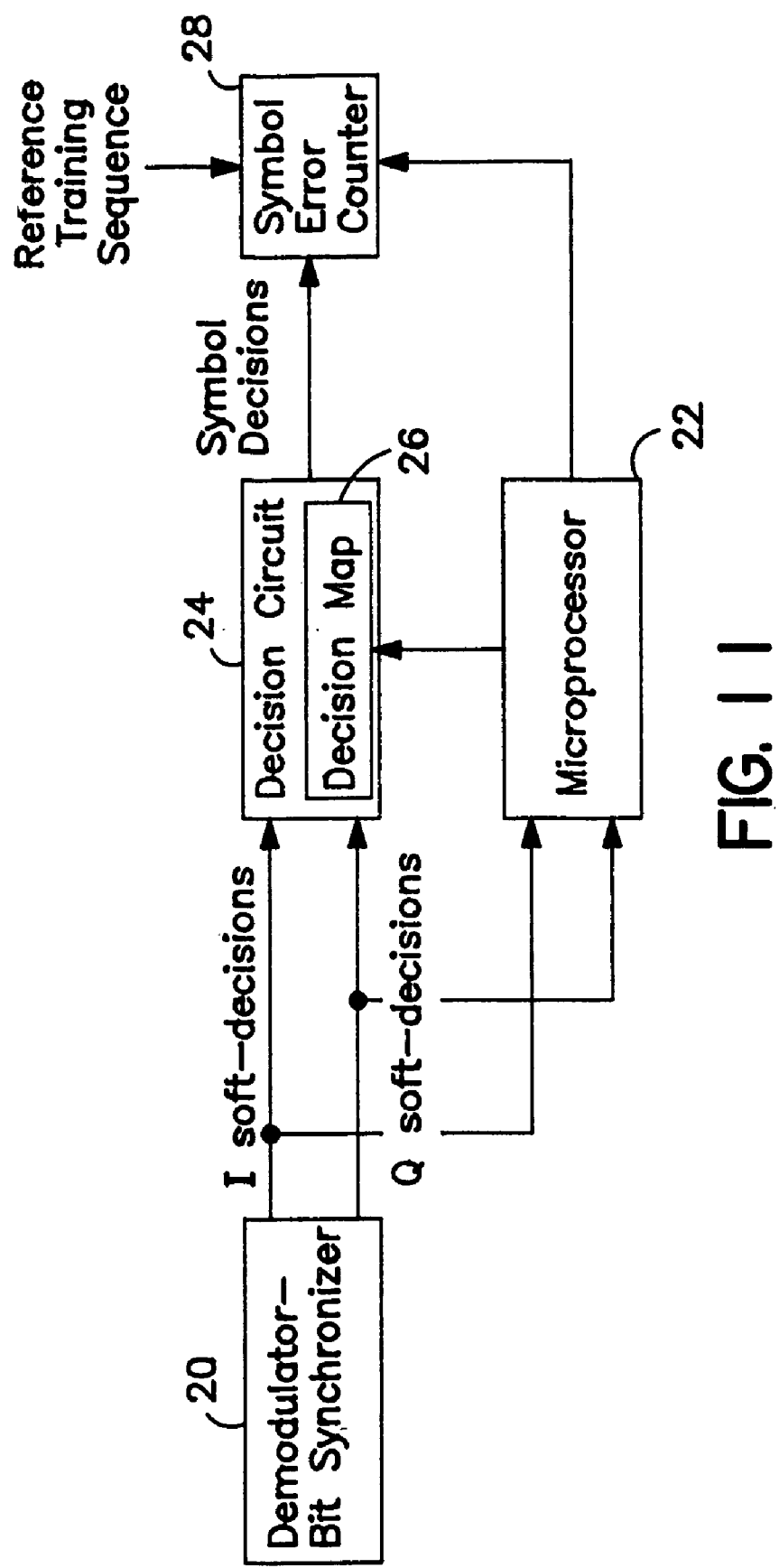
FIG. 11 is similar to FIG. 10 but includes an optional symbol error counter for providing further optimization of the bit error rate.
Figure 12:
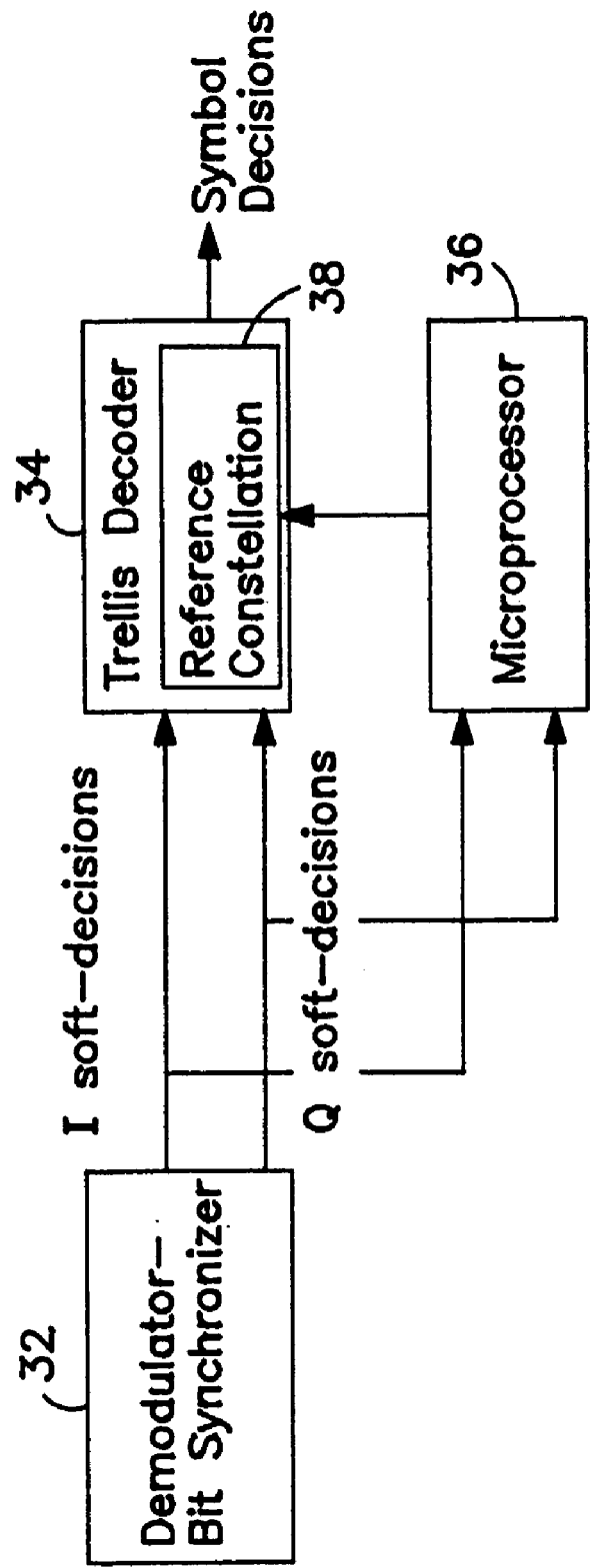
FIG. 12 is a block diagram of a demodulator in accordance with the present invention which utilizes soft-decision decoding techniques.
Figure 13:
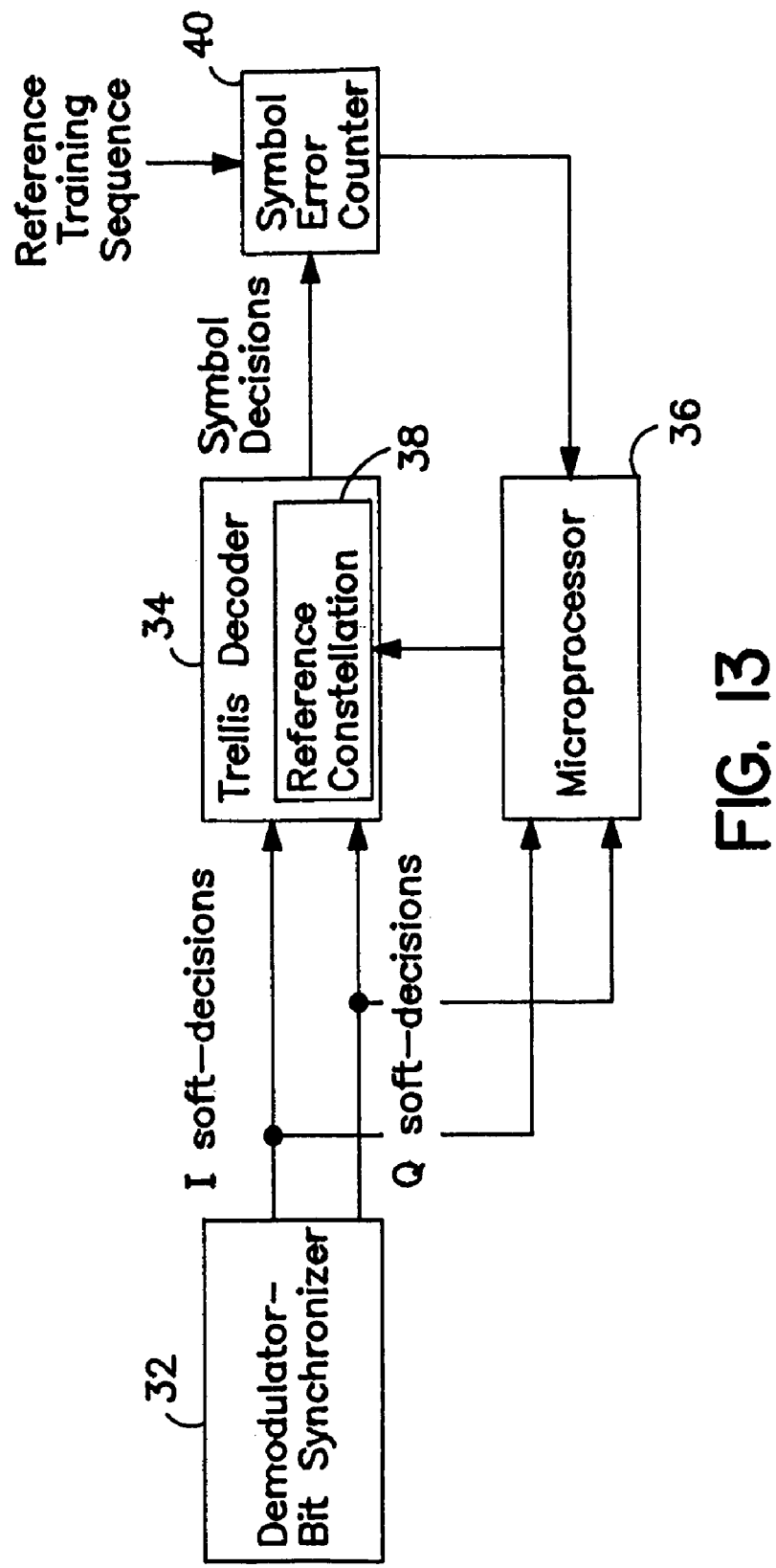
FIG. 13 is similar to FIG. 12 but includes an optional hardware for further optimizing the bit error rate.

Exemplary block diagrams for the invention are illustrated in FIGS. 10–13. Specifically, FIGS. 10 and 11 represent exemplary block diagrams for implementing a demodulator for demodulating signals by hard-decision techniques, such as phase shift keying (PSK) and quatrature amplitude modulation (QAM). FIGS. 12 and 13 are exemplary block diagrams for demodulating signals by soft-decision techniques, such as Viterbi decoding and trellis decoding.

FIGS. 10 and 12 represent exemplary demodulators which are adapted to improve the bit error rate of decoded signals. FIGS. 11 and 13 are similar to FIGS. 10 and 12, respectively and add an optional symbol error counter, which may be implemented as a binary counter in which decoded symbols are compared with a reference training sequence in order to further improve the bit error rate as will be discussed below. In all embodiments, the hardware is standard and generally known in the art and is illustrated here merely for purposes of discussion.

Referring first to FIG. 10, the system includes a demodulator-bit synchronizer 20, microprocessor 22 and a decision circuit 24. As mentioned above, this hardware is all standard and extremely well known in the art. As known in the art, PSK and QAM signals are demodulated and synchronized in a known matter generating in phase and quadrature signal components I and Q. These signal components I and Q are applied to a known decision circuit 24 as well as to the microprocessor 22. As discussed above, the decision regions or centroids for the points are quantized and mapped to a decision map 26 within the decision circuit 24. The decision map 26 is implemented by electronic memory. The microprocessor 22 uses the adaptive decision regions in the decision map 26 in order to decode the symbols.

FIG. 11 is similar and additionally includes a symbol error counter 28 which may be implemented as a simple binary comparator. As mentioned above, the symbol error counter 28 is optional and may be used to further improve the bit error rate of the decoded signal. In this embodiment, the decoded symbols are compared with a reference training sequence. In particular, the transmitter is forced to transmit a reference training sequence. The decoding of the symbols of the reference training sequence is compared with the actual symbols used for the reference training sequence. Depending on the results of this comparison, the decision boundaries may be further adjusted to further improve the bit error rate.

FIGS. 12 and 13, as mentioned above represent a block diagram embodiment of a demodulator in accordance with the present invention, which utilizes soft-decision detection techniques, such as Viterbi decoding and trellis decoding. Similar to the embodiments illustrated in FIGS. 10 and 11, the system includes a demodulator-bit synchronizer 32, a trellis decoder 34 and a microprocessor 36. As mentioned above, these devices 32, 34, and 36 are known. In this embodiment, in accordance with the present invention, as discussed above the distance between a symbol and a reference constillator is optimized in order to minimize the bit error rate in the manner as discussed above. FIG. 13 is similar but optionally includes a symbol error counter 40 as discussed above in order to further adjust the reference constellation and further minimize the bit error rate.

Obviously, many modifications and variations of the present invention are possible in light of the above teachings. Thus, it is to be understood that, within the scope of the appended claims, the invention may be practiced otherwise than as specifically described above.

We claim:

1. A demodulator comprising:
    a system for receiving modulated signals defining received signals;
    a storage device for storing initial decision boundaries for use in demodulating said modulated signals;
    a system for determining the actual distance between said received signals;
    a system for adjusting said initial boundaries as a function of said actual distance between said received signals, defining adjusted decision boundaries; and
    a system for decoding said modulated signals relative to said adjusted decision boundaries.

2. The demodulator as recited in claim 1, wherein said system for adjusting includes a system for mapping said adjusted boundaries to a decision map.

3. A demodulator comprising:
    a system for receiving modulated signals defining received signals;
    a storage device for storing initial decision boundaries for use in demodulating said modulated signals;
    a system for determining the actual distance between said received signals relative to said initial decision boundaries;
    a system for adjusting said initial boundaries as a function of said actual distance defining adjusted decision boundaries;
    a system for decoding said modulated signals relative to said adjusted decision boundaries; and
    a system for transmitting and decoding a predetermined training sequence defining decoded reference signals and a symbol error counter for comparing said decoded reference signals to a predetermined training sequence to further improve the bit error rate.

4. A demodulator comprising:
    a system for receiving modulated signals defining received signals;
    a storage device for storing initial decision boundaries for use in demodulating said modulated signals;
    a system for determining the actual distance between said received signals relative to said initial decision boundaries;

a system for adjusting said initial boundaries as a function of said distance between said received signals, defining adjusted decision boundaries;

a system for decoding said modulated signals relative to said adjusted decision boundaries; and a system for measuring the bit error rate (BER), wherein said system for adjusting includes a system for dithering the location of said decision boundaries while said bit error rate (BER) is measured and selecting the location of the decision boundary where the BER is minimal.

5. A demodulator comprising:

a system for receiving modulated signals defining received signals;

a storage device for storing a reference constellation;

a system for determining the actual distance between said received signals;

a system for adjusting the location of said reference constellation as a function of said actual distance between said received signals defining an adjusted reference constellation and storing said adjusted reference constellation; and a system for decoding said received signals relative to said adjusted reference constellation.

6. The demodulator as recited in claim 5, wherein said system for adjusting includes a system for mapping said adjusted reference constellation to a memory map.

7. A demodulator comprising:

a system for receiving modulated signals defining received signals;

a storage device for storing a reference constellation;

a system for determining the actual distance between said received signals and said reference constellation;

a system for adjusting the location of said reference constellation as a function of said actual distance between said received signals defining an adjusted reference constellation and storing said adjusted reference constellation; and a system for decoding said receiving signals relative to said adjusted constellation, wherein said system for adjusting includes a system for dithering each point in said reference constellation and selecting a location for said reference constellation in which the bit error rate is minimal.

8. The demodulator as recited in claim 7, wherein said system for dithering includes a system for dithering said points of said reference constellation in one or the other of a horizontal or vertical direction.

9. The demodulator as recited in claim 7, wherein said system for dithering includes a system for dithering said points in said reference constellation in both a horizontal and a vertical direction.

10. A method for demodulating a signal comprising the steps of:

(a) receiving modulated signals defining received signals;

(b) storing a predetermined decision boundary for demodulating said received signals;

(c) determining the actual distance between pairs of said received signals and comparing said predetermined decision boundaries with the midpoint of said distance;

(d) adjusting said predetermined boundaries so as to be at the midpoint of said actual distance between said received signals defining adjusted decision boundaries;

(e) storing said adjusted decision boundaries; and (f) decoding said received signals relative to said adjusted decision boundaries.

11. A method for demodulating a signal as recited in claim 10, wherein said adjusting step includes the step of mapping said adjusted boundaries to a decision map.

12. A method for demodulating a signal comprising the steps of:

(a) receiving modulated signals defining received signals;

(b) storing a predetermined decision boundary for demodulating said received signals;

(c) determining the actual distance of said received signals relative to said predetermined decision boundaries;

(d) adjusting said predetermined boundaries as a function of said actual distance defining adjusted decision boundaries;

(e) storing said adjusted decision boundaries;

(f) decoding said received signals relative to said adjusted decision boundaries defining decoded signals; and (g) providing a symbol error counter for comparing said decoded signals to a predetermined training sequence to further improve the bit error rate.

13. A method for demodulating a signal comprising the steps of:

(a) receiving modulated signals defining received signals;

(b) storing a predetermined decision boundary for demodulating said received signals;

(c) determining the actual distance of said received signals relative to said predetermined decision boundaries;

(d) adjusting said predetermined boundaries as a function of said actual distance defining adjusted decision boundaries;

(e) storing said adjusted decision boundaries;

(f) decoding said received signals relative to said adjusted decision boundaries; and (g) measuring the bit error rate; wherein said adjusting step comprises: dithering the location of said decision boundaries while said bit error rate (BER) is measured and selecting the location of the decision boundary at which the BER is minimal.

14. A method for demodulating a signal comprising the steps of:

(a) receiving modulated signals defining received signals;

(b) storing a reference constellation;

(c) determining the actual distance between pairs of said received signals;

(d) adjusting the location of said reference constellation as a function of said actual distance defining an adjusted constellation;

(e) storing said adjusted reference constellation; and (f) decoding said signals relative to said adjusted reference constellation.

15. A method for demodulating a signal as recited in claim 14, wherein said adjusting step includes the step of mapping said adjusted reference constellation to a memory map.

16. A method for demodulating a signal comprising the steps of:

(a) receiving modulated signals defining received signals;

(b) storing a reference constellation;

(c) determining the actual distance between said received signals and said reference constellation;

(d) adjusting the location of said reference constellation as a function of said actual distance defining an adjusted reference constellation;

(e) storing said adjusted reference constellation;

(f) decoding said signals relative to said adjusted reference constellation;

(g) measuring the bit error rate (BER); and (h) dithering each point in said reference constellation while said bit error rate (BER) is measured and selecting a location for said reference constellation in which the bit error rate is minimal.

17. A method for demodulating a signal as recited in claim 16, wherein said dithering step comprises dithering said points of said reference constellation in one or the other of a horizontal or vertical direction.

18. A method for demodulating a signal as recited in claim 16, wherein said dithering step comprises dithering said points in said reference constellation in both said horizontal and said vertical direction.

* * * * *